United States Patent [19]
Stevens et al.

[11] Patent Number: 5,809,191
[45] Date of Patent: Sep. 15, 1998

[54] OPTICAL CONNECTOR

[75] Inventors: Rick C. Stevens, Apple Valley; Gerald F. Sauter, Eagan, both of Minn.

[73] Assignee: Lockheed Martin Corporation, Bethesda, Md.

[21] Appl. No.: 802,487

[22] Filed: Feb. 20, 1997

[51] Int. Cl.[6] ................................................ G02B 6/38
[52] U.S. Cl. ............................................ 385/59; 385/60
[58] Field of Search ........................................ 385/56–68

[56] References Cited

U.S. PATENT DOCUMENTS

| | | | |
|---|---|---|---|
| 5,126,845 | 6/1992 | Yamashita | 358/160 |
| 5,216,732 | 6/1993 | Knott | 385/59 |
| 5,664,039 | 9/1997 | Grinderslev et al. | 385/59 |

*Primary Examiner*—John Ngo
*Attorney, Agent, or Firm*—Jacobson and Johnson; Glenn W. Bowen

[57] ABSTRACT

An optical connector is formed by mounting mating optical cable ferrules in separate connector housing sections and then joining the sections together.

4 Claims, 2 Drawing Sheets

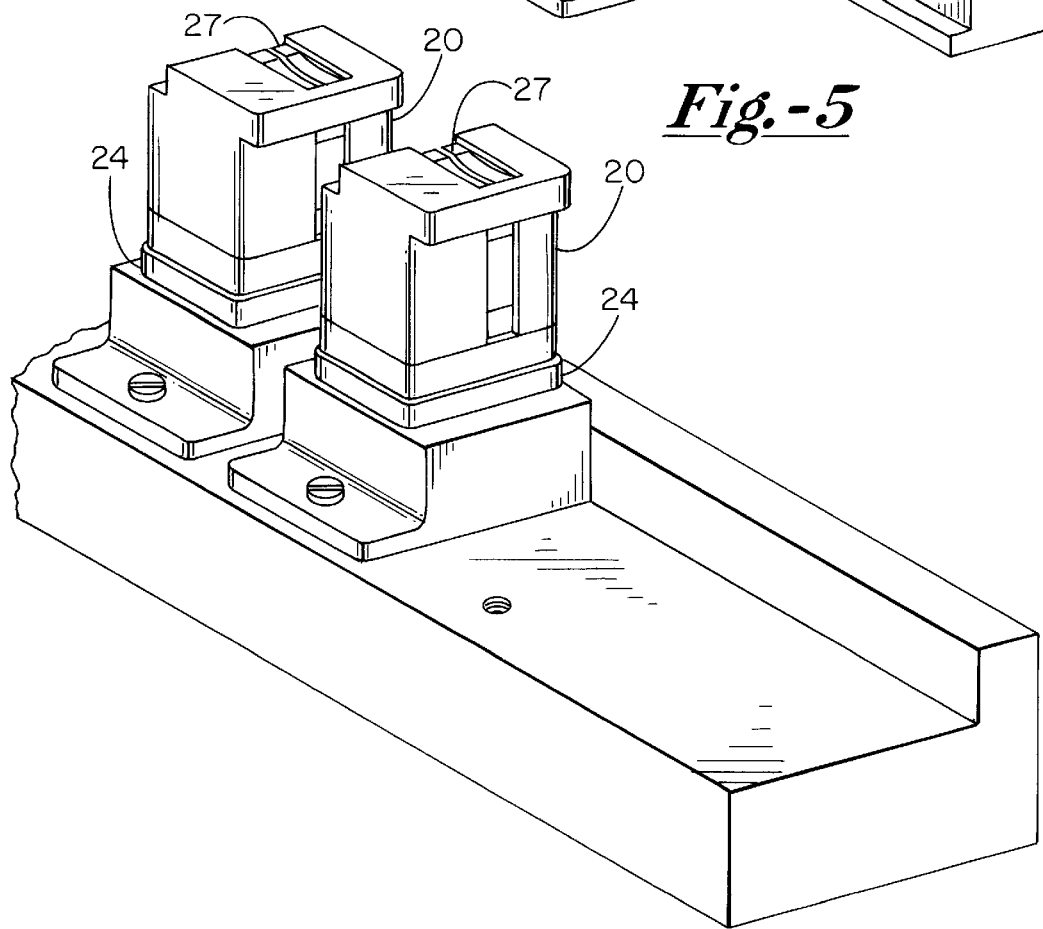

OPTICAL CONNECTOR

This invention was made with Government support under Contract NOO163-93-C-0072 awarded by the United States Navy. The government has certain rights in this invention.

FIELD OF THE INVENTION

This invention is aimed at providing an optical connector for use in electronic applications in conjunction with other connectors mounted on frames or in assemblies which merge optical backplanes with electrical backplanes. More specifically, the invention is aimed at providing an optical connector which meets rigid environmental specifications such as required by the military utilizing commercially available optic ferrules.

BACKGROUND OF THE INVENTION

U.S. patent application titled BACK PLANE CONNECTORS WITH SEPARABLE ELECTRICAL AND OPTICAL CONNECTORS, U.S. Ser. No. 08/802,486 by the same applicants as the instant application and filed concurrently describes the arrangement of a combined electrical and optical backplane as a single unit yet providing or allowing each of the backplane connectors to be separately removed and/or inserted. This arrangement is particularly useful in avionics because it tends to save on space utilization and weight but under those conditions must meet rigid specifications particularly if used in military avionics. The optical connector provided by this invention meets the required specifications.

SUMMARY OF THE INVENTION

Commercially available optical ferrules which are generally used with optical fiber cables to provide optical contacts are each mounted in a section of a connector housing and the two housing sections are joined together so that the ferrule contacts are in alignment with respect to one another and in low optical loss butting arrangement. This results in a connector which meets the rigid avionic specifications yet uses a commercially available part so that the cost is considerably reduced without reducing the benefits and making the connector utilizable in the aforementioned electrical and optical connector backplane assemblies.

BRIEF DESCRIPTION OF THE DRAWINGS

FIG. 3 is an isometric view of the connector with the housing sections separated;

FIG. 4 is a view taken along viewing line 4—4 of FIG. 3; and

FIG. 5 illustrates the connector mounted on a frame for use in a backplane assembly.

DESCRIPTION OF THE PREFERRED EMBODIMENTS

Figure 1:
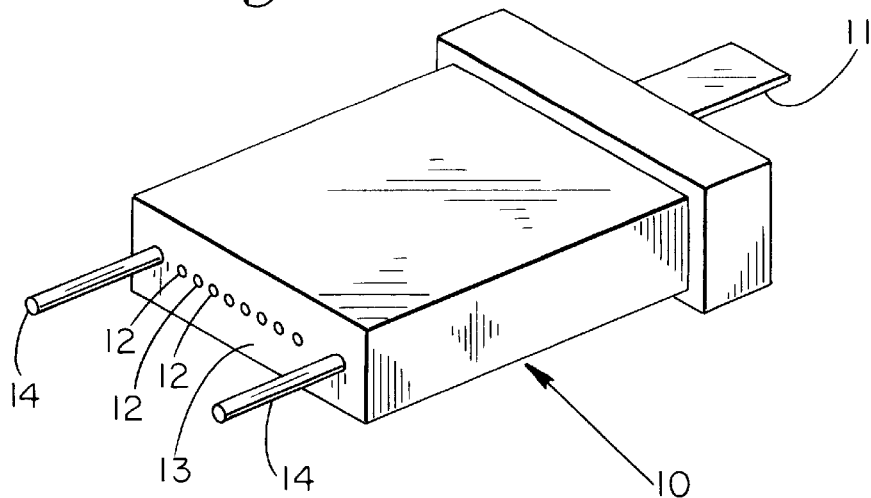
FIG. 1 is an illustration of a typical commercially available optical fiber cable ferrule utilized in the preferred form of the instant invention.

A conventional and commercially available ferrule 10 is conventionally attached to the end of a multi-fiber optical cable or ribbon 11 to provide at an open face of the ferrule 13 a set of spaced-apart aligned contacts 12 for each of the fibers in the multi-fiber cable 11. Typically the cables come in 4, 8 and 12 fiber configurations and possibly 16 fibers. In order to set the environment of the invention as to the size, the dimensions of a typical ferrule, no limitation being intended, is overall length of 8 mm a height as viewed in FIG. 1 of about 2.5 mm, a width of about 6.4 mm, the spacings between each of the contact points 12 being in the order of about 0.250 mm and the cable fibers individually attached to the contacts 12 in the order of about 0.125 mm diameter. A pair of guide pins 14 extend parallel to one another and orthogonally outward from the contact face of ferrule 10.

Figure 2:
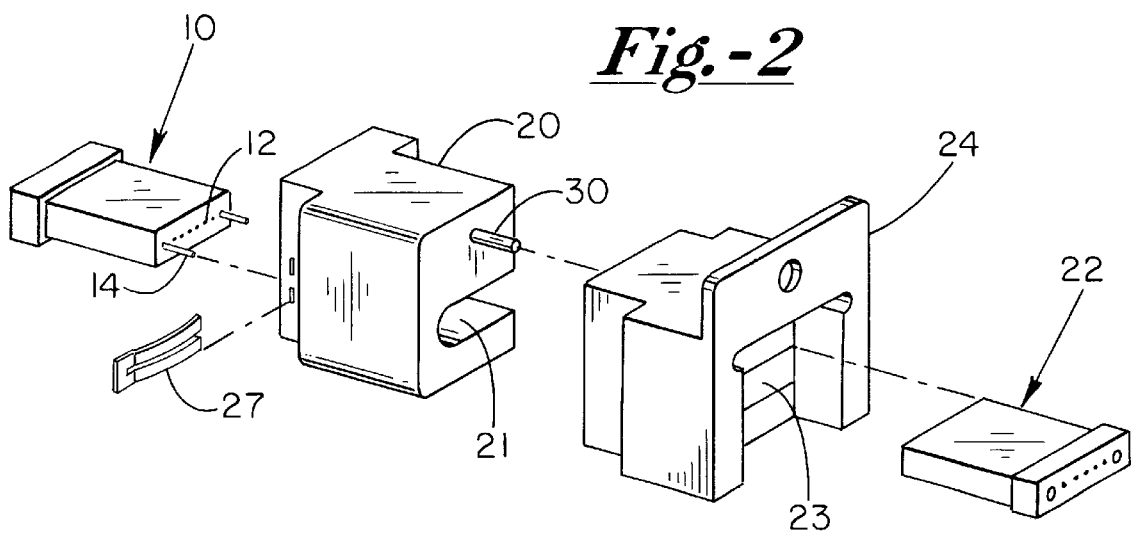
FIG. 2 is a blowapart illustration of the fully assembled connector.

As seen most clearly in FIG. 2, 3, and 4 a first ferrule 10 is mounted in a molded plastic connector body section 20 resting in a cavity 21 which extends through the length or depth of the connector section 20. The shape of connector section 20 is generally rectangular or box-like but the shape is dependent upon the nature of the application; in other words, in what type of frame or backplane the connector is going to be used with. A second commercially available conventional ferrule 22, similar to ferrule 10, rests in the recess 23 of a second molded plastic connector housing section 24. Ferrule 22 is the mating counterpart of ferrule 10. It has a series of contacts designated collectively by reference numeral 25 which correspond in spacing and size to the contacts 12 on ferrule 10. The contact face of ferrule 22 has a set of guide holes or recesses 26 for receiving guide pins 14 on ferrule 10. Ferrule 22 is bonded or otherwise fixedly attached in the cavity 23 of connector housing section 24 with the contact face located in such a fashion that when the two connector housing sections 20 and 24 are brought together the respective contacts on the respective ferrules are brought into alignment and are in close contact with one another. A finger-like spring member 27 is inserted into a recess 28 in the opening of cavity 21 to apply bias urging ferrule 10 toward the contact face of ferrule 22 so that the two sets of contacts are held in an intimate butting relationship with low optical loss. Connector housing section 20 has a guide pin 30 extending outward from a face of the section toward an opening or recess 31 in the opposing face of housing section 24 so when the two sections are brought together they are guided into a positive relationship to bring the two ferrules into general alignment and then the guide pins 14 and the receiving holes or recesses 26 bring the two ferrules into precise alignment so that the respective contacts are in proper alignment with one another.

As illustrated in FIG. 5, a typical application is illustrated showing the connectors with the two sections joined or mated together mounted on a frame 35. Connector housing section 24 may have mounting pins for use in making alignment with further attached frames or connectors.

I claim:

1. A multifiber optical cable connector, comprising:

a first ferrule for receiving an end of a multifiber optical cable and placing each fiber at a respective contact located at an outer face of the ferrule, said first ferrule mounted in a first connector housing section;

a second ferrule having contacts at an outer face corresponding to the contacts on said first ferrule, said second ferrule mounted in a second connector housing section;

one of said housing sections having a guide pin and the other housing section having a guide pin receiving recess for bringing said contact faces of said ferrules into general alignment when the two housing sections are joined together;

one of said ferrules having a pair of alignment pins and the other ferrule having a corresponding pair of pin receiving recesses, said ferrule contacts being precisely aligned by said alignment pins and in intimate positive low-optical loss contact when said connector housing sections are joined together;

one of said ferrules fixedly mounted to its housing section;

the other ferrule mounted in its housing section spring-biased toward intimate butting engagement with said one ferrule when said housing sections are joined together.

2. The optical connector as described in claim 1 wherein one of said housing sections has means for removably attaching the section to a mounting frame.

3. A multifiber optical cable connector, comprising:

a first ferrule for receiving an end of a multifiber optical cable and placing each fiber at a respective contact located at an outer face of the ferrule, said first ferrule mounted in a first connector housing section;

a second ferrule having contacts at an outer face corresponding to the contacts on said first ferrule, said second ferrule mounted in a second connector housing section;

one of said housing sections having a guide pin and the other housing section having a guide pin receiving recess for bringing said contact faces of said ferrules into general alignment when the two housing sections are joined together;

one of said ferrules having a pair of alignment pins and the other ferrule having a corresponding pair of pin receiving recesses, said ferrule contacts being precisely aligned by said alignment pins and in intimate positive low-optical loss contact when said connector housing sections are joined together;

one of said ferrules fixedly mounted to its housing section;

the other ferrule movably mounted in its housing;

a recess in the housing for said other ferrule; and a spring located in said recess biased to urge said other ferrule into intimate butting contact with said one ferrule.

4. A multifiber optical cable connector, comprising:

a first ferrule having a multitude of contacts on a contact face, each contact receiving a fiber from a multifiber optical cable;

a first housing;

a second ferrule having a multitude of contacts on a contact face corresponding to the contacts on said first ferrule;

a second housing;

one of said ferrules fixedly mounted in said first housing and the other of said ferrules movably mounted in said second housing;

said housings joined together to bring the contact faces of said ferrules into contact with one another;

one of said housings having a guide pin and the other housing having a guide pin receiving recess for bringing said contact faces of said ferrules into general alignment when the two housings are joined together;

one of said ferrule shaving a pair of alignment pins and the other ferrule having a corresponding pair of pin receiving recesses, said ferrule contacts being precisely aligned by said alignment pins and in intimate positive low-optical loss contact when said housings are joined together;

a recess in said second housing; and a spring located in said recess biased to urge the ferrule in said second housing into intimate butting contact with the other ferrule.

* * * * *